(12) United States Patent
Yamashita et al.

(10) Patent No.: US 8,305,202 B2
(45) Date of Patent: Nov. 6, 2012

(54) ANTITHEFT APPARATUS FOR EQUIPMENT WITH PRIME MOVER

(75) Inventors: Kosei Yamashita, Wako (JP); Masato Takeda, Wako (JP); Makoto Yamamura, Wako (JP); Yoshihisa Shinogi, Wako (JP); Masashi Manita, Wako (JP); Yoshinori Maekawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 227 days.

(21) Appl. No.: 12/961,165

(22) Filed: Dec. 6, 2010

(65) Prior Publication Data

US 2011/0133911 A1 Jun. 9, 2011

(30) Foreign Application Priority Data

Dec. 9, 2009 (JP) ................................. 2009-279932

(51) Int. Cl.
*B60R 25/10* (2006.01)
(52) U.S. Cl. ...................... 340/426.1; 340/10.1; 340/5.8; 340/5.86; 307/10.5; 307/10.2; 307/10.3
(58) Field of Classification Search ............... 340/426.1, 340/10.1, 5.8, 5.86; 307/10.5, 10.2, 10.3
See application file for complete search history.

(56) References Cited

U.S. PATENT DOCUMENTS

| | | | |
|---|---|---|---|
| 5,513,105 A | 4/1996 | Krones | |
| 6,204,570 B1 * | 3/2001 | Muller | 307/10.5 |
| 6,683,391 B1 * | 1/2004 | Enoyoshi et al. | 307/10.5 |
| 8,162,759 B2 * | 4/2012 | Yamaguchi | 463/42 |
| 2006/0187007 A1 * | 8/2006 | Konno et al. | 340/426.15 |
| 2006/0248346 A1 * | 11/2006 | Shiomi et al. | 713/184 |
| 2009/0138714 A1 * | 5/2009 | Matsushita et al. | 713/171 |
| 2011/0132680 A1 * | 6/2011 | Yamamura et al. | 180/287 |
| 2011/0133550 A1 * | 6/2011 | Manita et al. | 307/10.5 |

FOREIGN PATENT DOCUMENTS

| | | |
|---|---|---|
| JP | 2007-090908 A | 4/2007 |
| JP | 2007-112363 A | 5/2007 |

* cited by examiner

*Primary Examiner* — Hoi Lau
(74) *Attorney, Agent, or Firm* — Arent Fox LLP

(57) ABSTRACT

In an apparatus for preventing theft of equipment having a prime mover, an prime mover controller, and an authenticator that acquires ID information from an electronic key when the key is brought close thereto by an operator, and permits the prime mover controller to start the prime mover when the acquired ID information is determined to correspond with authentication ID information, data indicating a number of times the key is updated is included in the ID information, and the authenticator determines whether the number of times indicated in the data is greater than that in the authentication ID information, and when the number of times indicated in the data is greater than that in the authentication ID information, updates the authentication ID information such that it is equal to the number of times indicated in the data, thereby enabling to easily update authentication ID information of the equipment.

8 Claims, 4 Drawing Sheets

ANTITHEFT APPARATUS FOR EQUIPMENT WITH PRIME MOVER

BACKGROUND OF THE INVENTION

1. Field of the Invention

This invention relates to an antitheft apparatus for equipment with a prime mover.

2. Description of the Related

Conventionally, an antitheft apparatus (so-called an "immobilizer") for equipment like a vehicle having a prime mover is known which, when an electronic key storing ID information is manipulated by the operator, sends the ID information to an immobilizer controller to verify it with authentication ID information, and only when the authentication is verified (the ID information is valid), allows the prime mover to be started with the electronic key, thereby preventing theft, as taught, for example, by Japanese Laid-Open Patent Application No. 2007-90908.

SUMMARY OF THE INVENTION

In the above configuration, when the electronic key is lost, in order to prevent theft by the lost key, it is necessary to prepare another electronic key having new ID information and update authentication ID information stored in the equipment so as to correspond with the new ID information. Also, when the equipment is sold to a new owner (operator), since the former owner might keep a copy of the electronic key, the new owner needs to prepare an electronic key having new ID information and update authentication ID information of the equipment accordingly.

In this case, it is not so difficult to prepare an electronic key having new ID information because it suffices if the owner only requests the manufacturer to reissue an electronic key. However, as for the update of authentication ID information of the equipment, a service technician of the manufacturer needs to bring an updating device close to the equipment to update the information, or the owner needs to send the equipment itself to the manufacturer. Hence, it is bothersome.

An object of this invention is therefore to overcome the aforesaid problem by providing an antitheft apparatus for equipment with a prime mover that, when, for instance, an electronic key was lost or the equipment was sold to a new owner, enables to easily update authentication ID information of the equipment.

In order to achieve the object, this invention provides in its first aspect an apparatus for preventing theft of equipment having a prime mover, an prime mover controller that controls operation of the prime mover, and an authenticator that acquires ID information from an electronic key when the key is brought close thereto by an operator, determines whether the acquired ID information corresponds with authentication ID information, and permits the prime mover controller to start the prime mover when the acquired ID information is determined to correspond with the authentication ID information, characterized in that: the ID information includes data indicating a number of times the key is updated; and the authenticator determines whether the number of times indicated in the data is greater than that in the authentication ID information when the key is brought close thereto by the operator, and when the number of times indicated in the data is greater than that in the authentication ID information, updates the authentication ID information such that the number of times in the authentication ID information is equal to the number of times indicated in the data.

In order to achieve the object, this invention provides in its second aspect a method for preventing theft of equipment having a prime mover, an prime mover controller that controls operation of the prime mover, and an authentication comprising the steps of acquiring ID information from an electronic key when the key is brought close thereto by an operator, determining whether the acquired ID information corresponds with authentication ID information, and permitting the prime mover controller to start the prime mover when the acquired ID information is determined to correspond with the authentication ID information, characterized by the steps of: including data indicating a number of times the key is updated in the ID information; and determining whether the number of times indicated in the data is greater than that in the authentication ID information when the key is brought close thereto by the operator, and when the number of times indicated in the data is greater than that in the authentication ID information, updating the authentication ID information such that the number of times in the authentication ID information is equal to the number of times indicated in the data.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

An antitheft apparatus for equipment with a prime mover according to embodiments of the invention will now be explained with reference to the attached drawings.

Figure 1:
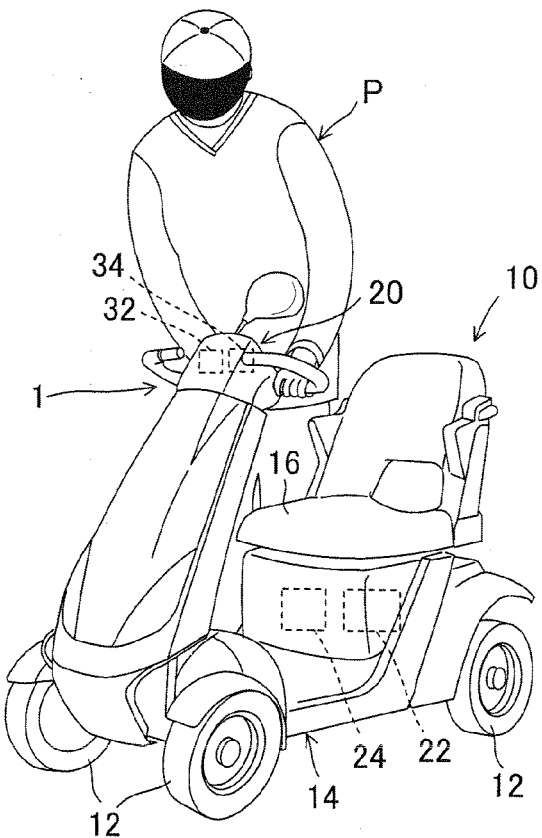
FIG. 1 is an overall schematic view of an antitheft apparatus for equipment with a prime mover according to an embodiment of the invention, including a small electric vehicle in which the apparatus is installed.

FIG. 1 is an overall schematic view of an antitheft apparatus for equipment with a prime mover according to an embodiment of the invention, including a small electric vehicle in which the apparatus is installed.

In FIG. 1, reference numeral 1 indicates the antitheft apparatus for equipment with a prime mover. In the following, the explanation will be made by taking a small electric vehicle as an example of the equipment.

The small electric vehicle is assigned by reference numeral 10. The vehicle 10 is a relatively small, single-passenger, electric vehicle, precisely an electric wheelchair or electric four-wheel scooter equipped with a body frame 14 supported by four wheels 12 (one of which is not shown in FIG. 1), a seat 16 installed on the frame 14 to be taken by the operator (person; user) P, and an operation unit 20 to be manually operated by the operator P. The vehicle 10 is a moving object that moves at extremely low speed, i.e., at a human walking speed, and is suitable for the elderly.

An electric motor (prime mover) 22 for driving the wheels 12 (specifically rear wheels) and a battery 24 for supplying operating power to the motor 22 are installed under the seat 16. The motor 22 comprises a DC brushless motor.

Figure 2:
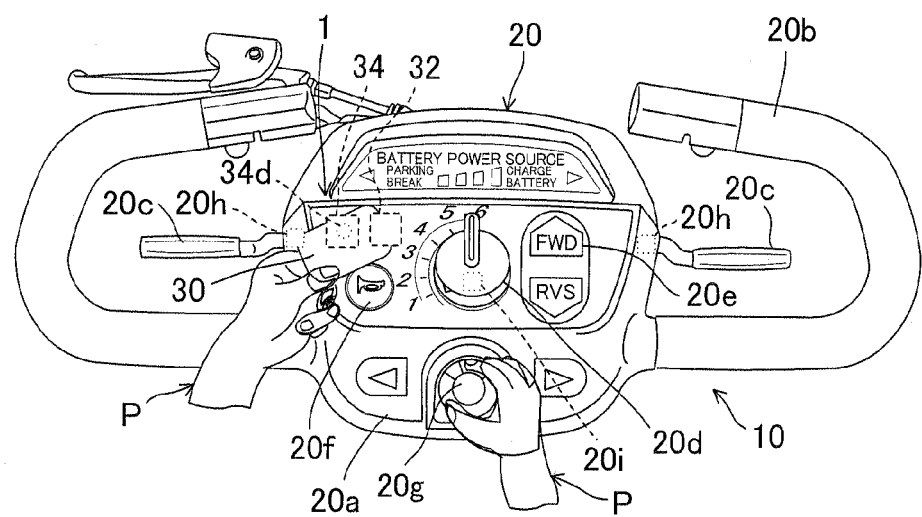
FIG. 2 is a front view of a control panel of the vehicle shown in FIG. 1.

FIG. 2 is a front view of the operation unit 20 of the vehicle 10 shown in FIG. 1.

As shown in FIG. 2, the operation unit 20 comprises a loop-shaped handle 20b laterally projecting, as curving, from a dashboard 20a, two drive levers 20c that laterally project and allow the operator P to input a moving/stopping instruction, a speed setting knob 20d that allows the operator P to set a desired travel speed within a range starting continuously from 1 km/h up to 6 km/h, forward/reverse switches 20e that allow the operator P to input a traveling direction instruction between forward and reverse travels, a horn switch 20f that allows the operator P to sound a horn (not shown), a power switch 20g that allows the operator P to connect/disconnect power from the battery 24 to the motor 22, and other components.

Two drive switches 20h are installed near the drive levers 20c. The drive switch 20h produces an ON signal when one of the drive levers 20c is manipulated by the operator P to drive and stops outputting the ON signal when manipulated by the operator P to stop. A speed setting knob sensor 20i is installed near the knob 20d and produces an output or signal (speed instruction) corresponding to the desired travel speed set by the operator P through the speed setting knob 20d.

Details of the vehicle 10 are described in Japanese Laid-Open Patent Application No. 2007-112363 proposed by the applicant earlier and the further explanation is omitted here.

Figure 3:
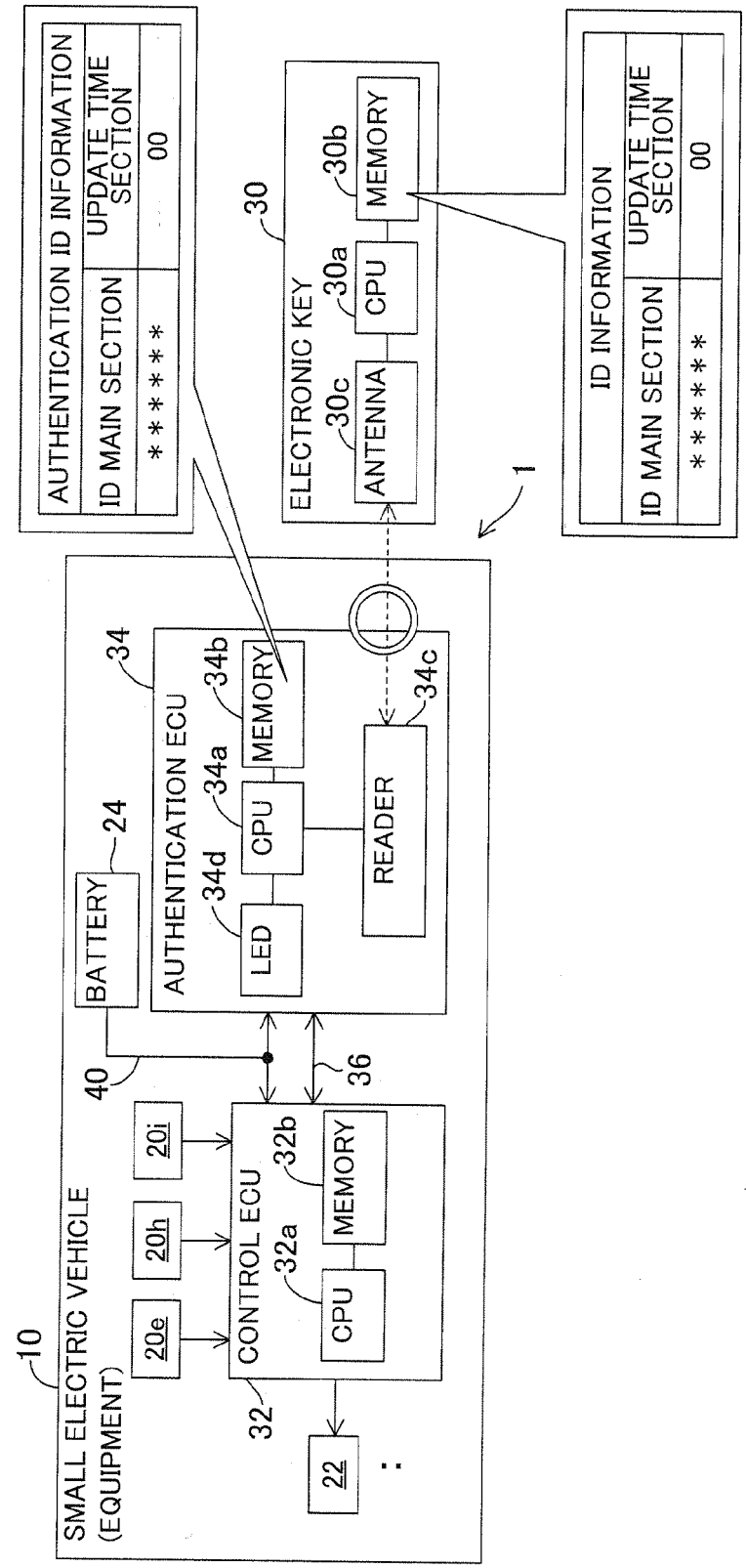
FIG. 3 is a block diagram showing the configuration of the apparatus shown in FIG. 1.

FIG. 3 is a block diagram showing the configuration of the apparatus 1 of the vehicle 10.

The apparatus 1 comprises an electronic key 30 that stores ID information (explained later), a control ECU (Electronic Control Unit; prime mover controller) 32 installed in the vehicle 10 for controlling the operation of the motor 22, and an authentication ECU (Electronic Control Unit; authenticator) 34 installed in the vehicle 10 for authenticating the key 30. The ECUs 32, 34 are disposed at appropriate locations in the vehicle 10, specifically in the interior of the dashboard 20a of the operation unit 20, as clearly shown in FIG. 2.

The control ECU 32 comprises a microcomputer having a CPU 32a, a memory (EEPROM or non-volatile memory) 32b and other components. The control ECU 32 is inputted by the operator P with a traveling direction instruction through the forward/reverse switch 20e, a drive instruction through the drive switch 20h, and a speed instruction through the speed setting knob sensor 20i. The control ECU 32 controls the operation of the motor 22 and the like in response to those instructions, thereby controlling the operation of the vehicle 10.

Specifically, the operator P selects a traveling direction using the forward/reverse switch 20e and sets desired travel speed using the speed setting knob 20d. Then, when the operator P grips or grasps one of (or both of) the drive levers 20c with the handle 20b, the vehicle 10 starts moving at the set speed, and when the operator P releases it, the vehicle 10 stops.

The authentication ECU 34, similarly to the control ECU 32, comprises a microcomputer having a CPU 34a, a memory (EEPROM or non-volatile memory) 34b for storing authentication ID information, and other components.

The authentication ECU 34 further comprises a reader 34c for reading (receiving) the ID information stored in the key 30, and an indicator 34d comprising an LED (Light-Emitting Diode).

The so-configured authentication ECU 34 is connected to the control ECU 32 through a communication line 36. A start enable signal, which will be explained later, is transmitted from the authentication ECU 34 to the control ECU 32 through the communication line 36. The ECUs 32, 34 are connected to the battery 24 through a power line 40 to be supplied with operating power from the battery 24.

The key 30 comprises a CPU 30a, a memory 30b for storing the ID information, and an antenna 30c for transmitting the ID information to the reader 34c by short-distance wireless communication (RFID: Radio Frequency Identification). The key 30 is made of resin and houses the CPU 30a and other components in its interior. The key 30 has a card shape of business card size to be portable. A plurality of keys 30 are prepared to have different ID information for multiple operators P.

As illustrated, the ID information stored in the key 30 includes data (information) contained in an ID main section and that contained in an updated time section. The ID main section contains identification data (operator ID) for identifying the operator P who carries the key 30, identification data (product ID) for identifying the model, product number, etc., of the vehicle 10 (indicated by asterisks in the drawing). The updated time section contains information on the number of times the key 30 was updated or reissued, (i.e., key update number of times). The key update number of times is the number of times the manufacturer reissued the key 30 in response to request by the operator (owner). More specifically, a value of "00" is contained in the updated time section of a first-issued electronic key 30, "01" in that of a second-issued (first-reissued) key 30, "02" in that of a third-issued (second-reissued) key 30, and so on.

The authentication ID information stored in the memory 34b of the authentication ECU 34 also includes data (information) contained in an ID main section and updated time section, as shown in FIG. 3. Similarly to the case of the key 30, the ID main section contains identification data (operator ID) for identifying the operator P and identification data (product ID) for identifying the model, product number, etc., of the vehicle 10. When the vehicle 10 is produced, a value of "00" representing the initial status is entered in the updated time section.

There now follows an explanation of the authentication operation between the key 30 and authentication ECU 34. When the key 30 is brought close to and held over the reader 34c by the operator P with the authentication ECU 34 being supplied with operating power from the battery 24, the reader 34c can read and output (transmit) radio wave to the key 30.

Upon receipt of the radio wave from the reader 34c, the key 30 generates power by electromagnetic induction of a built-in coil (not shown), thereby activating the CPU 30a. In other words, the key 30 is not equipped with a battery or other internal power supply source but is supplied with operating power induced by the radio wave from the reader 34c.

When supplied with power, the key 30 outputs the ID information stored in the memory 30b to the reader 34c through the antenna 30c. The authentication ECU 34 acquires the ID information from the key 30 and determines whether the acquired ID information corresponds with the authentication ID information stored in the memory 34b (i.e., the authentication operation is conducted).

When the above two data of ID information correspond with each other, the authentication ECU 34 determines that the key 30 brought close to the reader 34c is an authorized key for the vehicle 10 and sends the start enable signal to the control ECU 32. As a result, the control ECU 32 makes the motor 22 ready for start. Under this condition, when the power switch 20g is made ON, power is supplied from the battery 24 to the motor 22, and when the operator P grasps the drive lever 20c, the motor 22 is driven thereby.

In contrast, when the two data of ID information do not correspond with each other, the authentication ECU 34 determines that the key 30 is not an authorized key and hence, does not send the start enable signal to the control ECU 32. Therefore, even when the power switch 20g is turned ON, power is not supplied from the battery 24 to the motor 22 and even if the operator grasps the drive lever 20c, the motor 22 is not driven.

Thus, the apparatus 1 is configured such that, when the ID information of the key 30 corresponds with the authentication ID information, the authentication ECU 34 enables or allows the motor 22 to start, while, when the two data of ID information do not correspond with each other, it does not enable or allow the motor 22 to start, thereby preventing theft of the vehicle 10.

Figure 4:
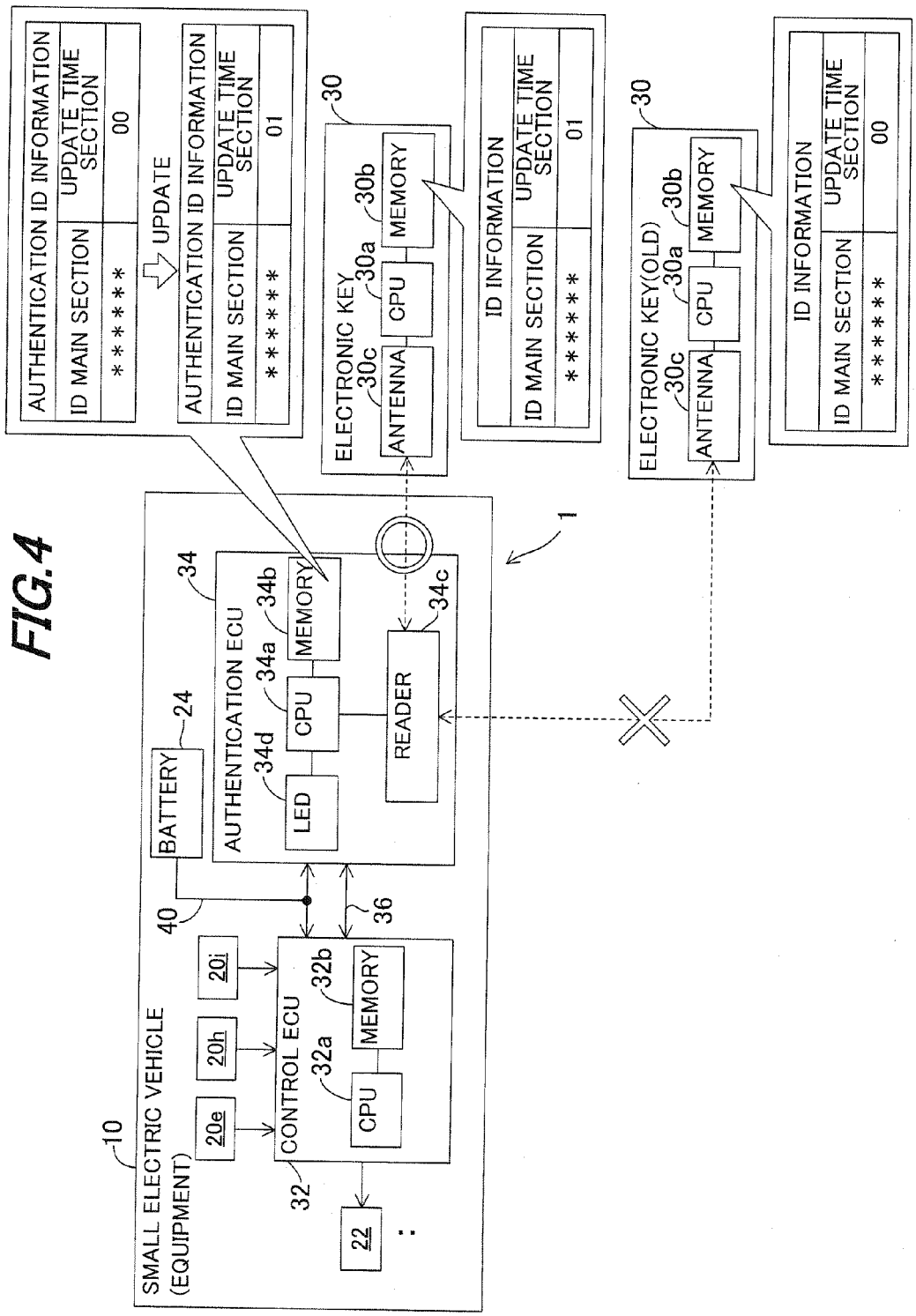
FIG. 4 is a block diagram similar to FIG. 3, but showing the configuration of the apparatus shown in FIG. 1.

The apparatus 1 according to this embodiment is characterized in that the updated time section of the ID information contains the information on the number of time the key 30 was updated as explained, and when an updated or reissued key 30 is manipulated as shown in FIG. 4, the authentication ECU 34 updates the authentication ID information therein so as to correspond with the new ID information of the reissued key 30. In the following, more details of the operation of the apparatus 1 will be explained.

Figure 5:
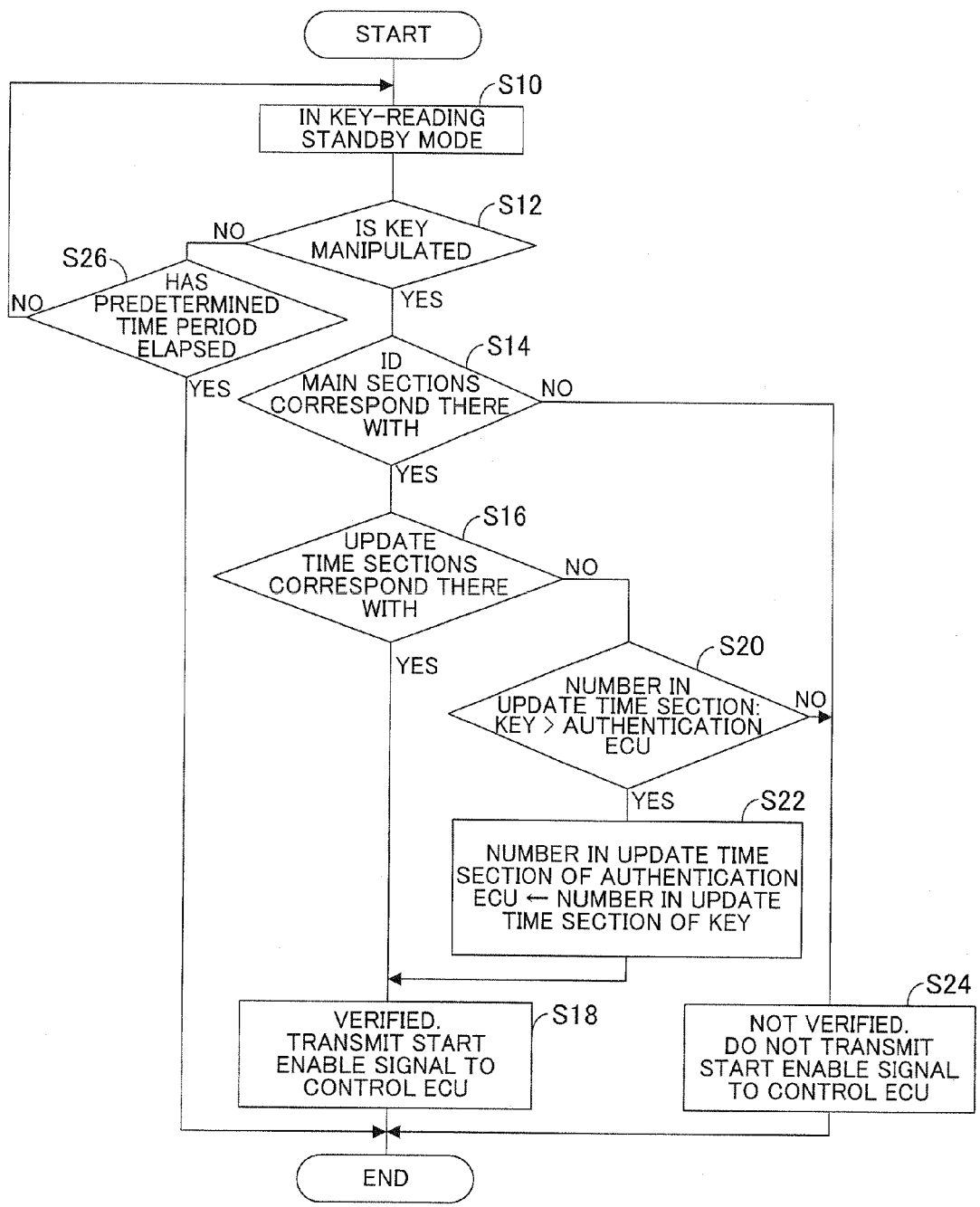
FIG. 5 is a flowchart showing the operation of the apparatus shown in FIG. 1.

FIG. 5 is a flowchart showing the operation of the apparatus 1. The illustrated program is executed only once upon activation of the authentication ECU 34. When an appropriate switch is made ON, the authentication ECU 34 is supplied with power from the battery 24 and activated.

The program begins at S10, in which a key-reading standby mode (i.e., a waiting condition for reading information stored in the key 30) is established. The program proceeds to S12, in which it is determined whether the key 30 is manipulated, i.e., is brought close to the reader 34c.

When the result in S12 is affirmative, the program proceeds to S14, in which it is determined whether information in the ID main section of the key 30 and that of the authentication ECU 34 correspond with each other. Specifically, as mentioned above, upon the manipulation of the key 30, the data of the ID information of the key 30 is acquired and it is determined whether the data (information) in the ID main section of the acquired ID information corresponds with that of the authentication ID information of the vehicle 10.

When the result in S14 is affirmative, the program proceeds to S16, in which it is determined whether the number (of times) in the updated time section of the ID information of the key 30 corresponds with that of the authentication ID information of the vehicle 10.

When the result in S16 is affirmative, since it means that the data of the ID information of the key 30 and that of the authentication ID information of the vehicle 10 wholly correspond with each other, the program proceeds to S18, in which the authentication is verified, i.e., the start enable signal is transmitted to the control ECU 32 (i.e., the authenticator ECU 34 permits the prime mover controller to start the prime mover when the acquired ID information is determined to correspond with the authentication ID information). Then the program is terminated and the authentication ECU 34 is made OFF.

On the other hand, when the result in S16 is negative, the program proceeds to S20, in which the number (of times) in the updated time section of the key 30 is compared with that of the authentication ECU 34. Specifically, it is determined whether the number (of times) in the updated time section of the key 30 is greater than that of the authentication ECU 34.

When the result in S20 is affirmative, the program proceeds to S22, in which the number (of times) in the updated time section of the authentication ECU 34 is updated (rewritten). Specifically, the value is updated so as to correspond with (to be equal to) the value in the updated time section of the key 30.

More specifically, the affirmative result in S20 means it is the first time that the ID information of a reissued key 30 is read by the authentication ECU 34. Therefore, the authentication ID information is updated so as to correspond with the ID information of the key 30. Following S22, the program proceeds to S18, in which the authentication is verified.

It should be noted that, when the ID information of the reissued key 30 is read for the first time, the ID information of the key 30 and the authentication ID information of the vehicle 10 does not wholly correspond with each other. However, since the authentication ID information is updated in the next step so as to correspond with the ID information of the key 30, it can be regarded as verified without going through the authentication operation again.

When the result in S20 is negative, the program proceeds to S24, in which the authentication is not verified, i.e., the start enable signal is not transmitted to the control ECU 32. Then the program is terminated and the authentication ECU 34 is made OFF.

More specifically, the negative result in S20 means that the ID information of an old key 30 is read after the ID information of the reissued key 30 has been read. In this case, the ID main sections correspond with each other but the two data of the whole ID information does not correspond, so that the authentication is not verified. The old key 30 could be a lost key 30 or a copy of the old key 30 kept by a former owner (operator), for example, and as shown in FIG. 4, the old key 30 is no longer verified as an authorized key.

When the result in S12 is negative, the program proceeds to S26, in which it is determined whether a predetermined time period (e.g., 30 seconds) has elapsed since the authentication ECU 34 was activated. When the result is No, the program returns to S10, while, when the result is Yes, the program is terminated and the authentication ECU 34 is made OFF.

As stated above, the embodiment is configured to have an apparatus (1) and method for preventing theft of equipment (electric vehicle 10) having a prime mover (electric motor 22), an prime mover controller (control ECU 32) that controls operation of the prime mover, and an authenticator (authentication ECU 34) that acquires ID information from an electronic key (30) when the key is brought close thereto by an operator (P; S10-S12), determines whether the acquired ID information corresponds with authentication ID information (S14-S16), and permits the prime mover controller to start the prime mover when the acquired ID information is determined to correspond with the authentication ID information (S18), characterized in that: the ID information includes data indicating a number of times the key is updated; and the authenticator determines whether the number of times indicated in the data is greater than that in the authentication ID information when the key is brought close thereto by the operator (S20), and when the number of times indicated in the data is greater than that in the authentication ID information, updates the authentication ID information such that the number of times in the authentication ID information is equal to the number of times indicated in the data (S22).

Specifically, it is determined by the equipment side whether the manipulated key is an updated or reissued key based on the ID information acquired from the key and when the result is Yes, the authentication ID information of the equipment is updated so as to correspond with the ID information of the key. With this, it becomes possible to update the authentication ID information of the equipment easily. As a result, even when the electronic key was lost or the equipment was sold to a new owner, it becomes possible to easily deal with it only by preparing a reissued key with new ID information.

Further, when it is determined that the key update number of times in the ID information of the key is less than that in the authentication ID information of the equipment, it means that the key is an old key, so that the authentication ID information of the equipment is not updated. Consequently the authentication is not verified, thereby preventing theft of the equipment by the old key.

In the apparatus, the authenticator updates the authentication ID information if data other than the number of times in the ID information of the key corresponds with that in the authentication ID information when the number of times indicated in the data is greater than that in the authentication ID information (S14, S16, S20, S22).

Specifically, it is reliably determined by the equipment side whether the manipulated key is an updated or reissued key based on the ID information acquired from the key and based thereon, the authentication ID information of the equipment is updated. With this, it becomes possible to reliably update the authentication ID information of the equipment.

In the apparatus and method, the equipment comprises an electric vehicle (10), and the prime mover comprises an electric motor (22).

It should be noted that, although the foregoing embodiment is explained taking the small electric vehicle having the electric motor as an example of the equipment, it may be an outboard motor having an internal combustion engine, or a machine which does not move with power from a built-in prime mover, e.g., an engine generator.

Japanese Patent Application No. 2009-279932, filed on Dec. 9, 2009, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for preventing theft of equipment having a prime mover, an prime mover controller that controls operation of the prime mover, and an authenticator that acquires ID information from an electronic key when the key is brought close thereto by an operator, determines whether the acquired ID information corresponds with authentication ID information, and permits the prime mover controller to start the prime mover when the acquired ID information is determined to correspond with the authentication ID information, characterized in that:

the ID information includes data indicating a number of times the key is updated; and the authenticator determines whether the number of times indicated in the data is greater than that in the authentication ID information when the key is brought close thereto by the operator, and when the number of times indicated in the data is greater than that in the authentication ID information, updates the authentication ID information such that the number of times in the authentication ID information is equal to the number of times indicated in the data.

2. The apparatus according to claim 1, wherein the authenticator updates the authentication ID information if data other than the number of times in the ID information of the key corresponds with that in the authentication ID information when the number of times indicated in the data is greater than that in the authentication ID information.

3. The apparatus according to claim 1, wherein the equipment comprises an electric vehicle.

4. The apparatus according to claim 3, wherein the prime mover comprises an electric motor.

5. A method for preventing theft of equipment having a prime mover, an prime mover controller that controls operation of the prime mover, and an authentication comprising the steps of acquiring ID information from an electronic key when the key is brought close thereto by an operator, determining whether the acquired ID information corresponds with authentication ID information, and permitting the prime mover controller to start the prime mover when the acquired ID information is determined to correspond with the authentication ID information, characterized by the steps of including data indicating a number of times the key is updated in the ID information; and determining whether the number of times indicated in the data is greater than that in the authentication ID information when the key is brought close thereto by the operator, and when the number of times indicated in the data is greater than that in the authentication ID information, updating the authentication ID information such that the number of times in the authentication ID information is equal to the number of times indicated in the data.

6. The method according to claim 5, wherein the step of updating updates the authentication ID information if data other than the number of times in the ID information of the key corresponds with that in the authentication ID information when the number of times indicated in the data is greater than that in the authentication ID information.

7. The method according to claim 5, wherein the equipment comprises an electric vehicle.

8. The method according to claim 7, wherein the prime mover comprises an electric motor.

* * * * *